United States Patent
Thomas, III et al.

(10) Patent No.: US 9,697,115 B2
(45) Date of Patent: Jul. 4, 2017

(54) SEGMENTED CACHES

(75) Inventors: Fred Charles Thomas, III, Fort Collins, CO (US); Walter A Gaspard, Magnolia, TX (US); Chi W So, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 485 days.

(21) Appl. No.: 14/353,862

(22) PCT Filed: Oct. 26, 2011

(86) PCT No.: PCT/US2011/057913
§ 371 (c)(1),
(2), (4) Date: Apr. 24, 2014

(87) PCT Pub. No.: WO2013/062542
PCT Pub. Date: May 2, 2013

(65) Prior Publication Data
US 2014/0297937 A1    Oct. 2, 2014

(51) Int. Cl.
*G06F 12/00* (2006.01)
*G06F 12/02* (2006.01)
(Continued)

(52) U.S. Cl.
CPC ...... *G06F 12/0246* (2013.01); *G06F 12/0802* (2013.01); *G06F 12/0842* (2013.01);
(Continued)

(58) Field of Classification Search
CPC ............ G06F 12/0246; G06F 12/0891; G06F 2212/7205; G06F 12/0802;
(Continued)

(56) References Cited

U.S. PATENT DOCUMENTS

| | | |
|---|---|---|
| 6,182,194 B1 | 1/2001 | Uemura et al. |
| 7,620,773 B2 | 11/2009 | Nicholson et al. |

(Continued)

FOREIGN PATENT DOCUMENTS

| | | |
|---|---|---|
| CN | 101213525 A | 7/2008 |
| CN | 100442250 C | 12/2008 |

(Continued)

OTHER PUBLICATIONS

Office Action, TW Application No. 101139719, Date Issued: Nov. 14, 2014, pp. 1-3.
(Continued)

*Primary Examiner* — Reginald Bragdon
*Assistant Examiner* — Hannah A Faye-Joyner
(74) *Attorney, Agent, or Firm* — HP Inc. Patent Department

(57) ABSTRACT

Embodiments herein relate to segmenting and pinning a first non-volatile memory to store cache information. In an embodiment, the first non-volatile memory is divided into a plurality of segments. Then, a first type of software of a plurality of types of software is pinned to a first segment of the plurality of segments. The first pinned segment stores the cache information associated with the first type of software.

14 Claims, 4 Drawing Sheets

(51) Int. Cl.
*G06F 12/0802* (2016.01)
*G06F 12/126* (2016.01)
*G06F 12/0891* (2016.01)
*G06F 12/0871* (2016.01)
*G06F 12/0842* (2016.01)

(52) U.S. Cl.
CPC ...... *G06F 12/0871* (2013.01); *G06F 12/0891* (2013.01); *G06F 12/126* (2013.01); *G06F 2212/222* (2013.01); *G06F 2212/6042* (2013.01); *G06F 2212/7205* (2013.01); *Y02B 60/1225* (2013.01)

(58) Field of Classification Search
CPC ....... G06F 2212/6042; G06F 2212/222; G06F 12/0871; G06F 12/0842; G06F 12/126
See application file for complete search history.

(56) References Cited

U.S. PATENT DOCUMENTS

| | | |
|---|---|---|
| 7,853,762 B2 | 12/2010 | Lee et al. |
| 7,890,691 B2 | 2/2011 | Jiang |
| 7,924,635 B2 | 4/2011 | Kim |
| 2002/0112116 A1* | 8/2002 | Nelson ............... G06F 12/0246 711/103 |
| 2007/0005898 A1 | 1/2007 | Halleck |
| 2008/0005462 A1 | 1/2008 | Pyeon et al. |
| 2008/0244173 A1 | 10/2008 | Takai |
| 2008/0244183 A1* | 10/2008 | Ishikawa ............... G06F 12/084 711/129 |
| 2010/0082904 A1 | 4/2010 | Juenemann et al. |
| 2010/0082936 A1 | 4/2010 | Hobbet et al. |
| 2010/0088459 A1 | 4/2010 | Arya et al. |
| 2011/0066792 A1 | 3/2011 | Shaeffer et al. |

FOREIGN PATENT DOCUMENTS

| | | |
|---|---|---|
| EP | 0475639 | 3/1992 |
| EP | 1691293 A1 | 8/2006 |
| JP | H02-016654 | 1/1990 |
| JP | H05-011933 | 1/1993 |
| JP | H06-282488 | 10/1994 |
| JP | 09114737 | 5/1997 |
| JP | H09-114737 | 5/1997 |
| JP | H10-154101 | 6/1998 |
| JP | H10-333984 | 12/1998 |
| JP | 2004-030090 | 1/2004 |
| JP | 2004-118305 | 4/2004 |
| JP | 2007-179546 | 7/2007 |
| JP | 2008-538437 | 10/2008 |
| KR | 20050012992 A | 2/2005 |
| TW | I222017 B | 10/2004 |
| TW | 201015331 A | 4/2010 |
| WO | WO-2011005249 A1 | 1/2011 |

OTHER PUBLICATIONS

International Searching Authority, Appl. PCT/US2011/057913, filed Oct. 26, 2011, Search Report and Written Opinion, 9pp, May 24, 2012.

* cited by examiner

SEGMENTED CACHES

BACKGROUND

A computing device may include a fast storage device, such as a flash memory, having a relatively fast access time. The fast storage device may be used as a cache to store frequently accessed information. However, fast storage device may be relatively more expensive per unit of storage than other types of storage devices have a relatively slow access time, such as a hard disk drive (HDD).

As a result, the fast storage device may be of relatively small storage capacity. If the fast storage device becomes filled to capacity, performance of the computing device may be affected. Manufacturers are challenged to more efficiently use the fast storage device in order to improve the performance of the computing device.

BRIEF DESCRIPTION OF THE DRAWINGS

The following detailed description references the drawings, wherein.

DETAILED DESCRIPTION

Figure 1:
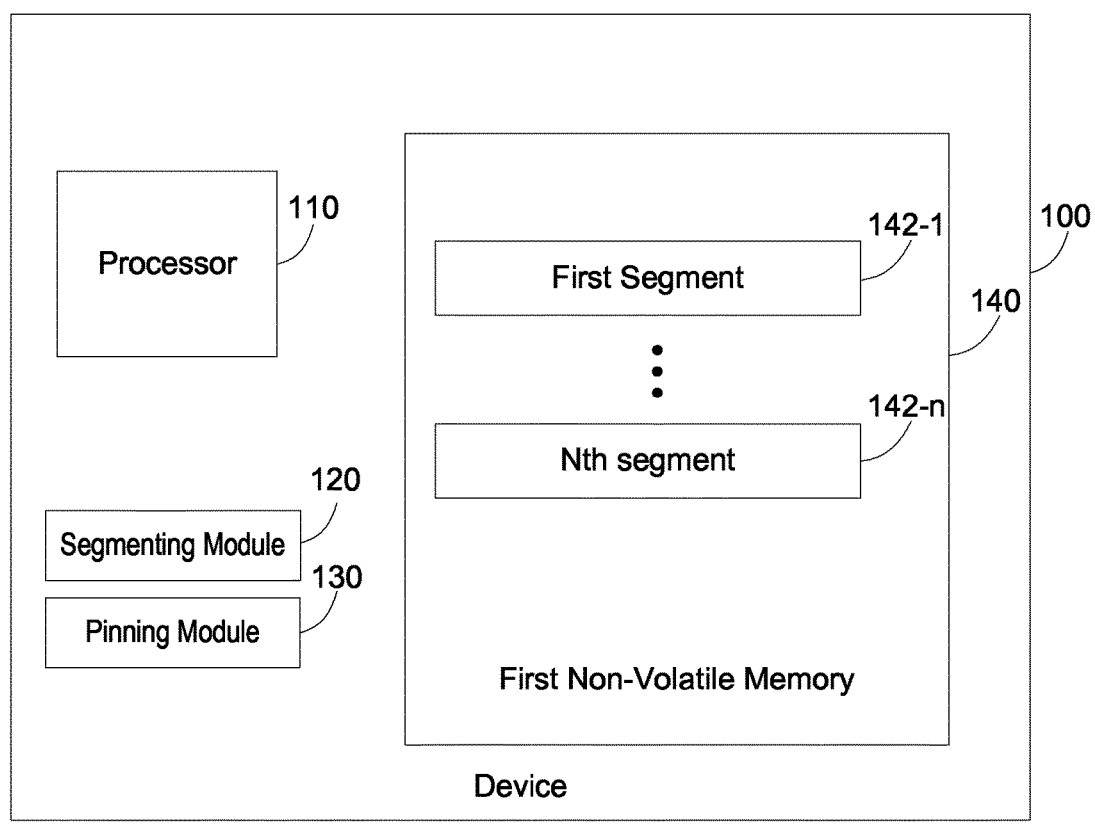
FIG. 1 is an example block diagram of a device having a first non-volatile memory including a plurality of segments.

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A computing device may include a faster storage device, such as a flash memory, in addition to a slower storage device, such as a hard disk drive (HDD). The faster storage device may have a lower latency than the slower storage device. The computing device may increase performance by storing more frequently accessed information, such as cache information, at the faster storage device, instead of the slower storage device. For example, the computing device may use the faster storage device as a cache to store cache information including frequently accessed software code and/or data thereof. The computing device may either immediately (write-through) or after a period of time (write-back) write the updated cache information at the faster storage device to the slower storage device. For example, non-temporary files in the faster storage device may be mirrored in the slower storage device after the cache is flushed.

However, the faster storage device may not have a large enough storage capacity to store all the cache information being used by the computing device. Also, if the cache information is not retrievable from the faster storage device, such as during a cache miss, the missing cache information may be retrieved from the slower storage device. Therefore, a storage capacity of the faster storage device may indirectly act as a bottleneck to the performance of the computing device. Moreover, as the faster storage device is generally significantly more expensive than the slower storage device per unit of memory, the storage capacity of the faster storage device may not generally be increased.

Further, as a first application is continuously used by a user, more of the cache information thereof may populate the faster storage device, allowing the first application to become progressively more responsive and/or improve in performance. For example, the first application may increasingly launch or run faster. However, if the user starts using a second application, this responsiveness may be lost as the user waits for the cache information of the second application to increasingly populate the faster storage device.

Moreover, due to the limited storage capacity of the faster storage device, the cache information of the first application may be overwritten with cache information of the second application. Therefore, should the user switch back to the first application, the first application may initially also be less responsive than before. Thus, a newly launched application may not be immediately responsive and/or responsiveness may be lost when reverting back to a previously used application, due to waiting for the faster storage device to be populated with the cache information of the application currently in use.

Embodiments may allow for software, such as the first application, to be immediately responsive or initially more responsive, even for a first access of the first application or even if another application, such as the second application, is heavily used between accesses of the first application. For example, in embodiments, the faster storage device may be divided into segments. At least one of these segments, such as a first segment, may be pinned to a type of software, such as the first application, so as to only store cache information of that type of software. Further, the cache information of that type of software may populate the segment pinned thereto even before that type of software is accessed.

For instance, the first application may be pinned to the first segment. Thus, at least some of the cache information of the first application, such as software code for launching the first application, may be stored at the first segment even before the first application is accessed. Hence, first application may be more responsive, such as by launching faster, even on a first access by the user. The user may heavily use the second application, and then switch back to the first application. Nonetheless, the first application will remain responsive because the cache information thereof will be retained in the first segment.

Referring now to the drawings, FIG. 1 is an example block diagram of a device 100 having a first non-volatile memory 140 including a plurality of segments 142-1 to 142-n. Examples of the device 100 may include a notebook computer, a desktop computer, an all-in-one system, a slate computing device, a portable reading device, a wireless email device, a mobile phone, and the like. In the embodiment of FIG. 1, the device 100 includes a processor 110, a segmenting module 120, a pinning module 130 and the first non-volatile memory 140. The first non-volatile memory 140 further includes the plurality of segments 142-1 to 142-n, where n is natural number greater than 1.

The processor 110 may be a CPU, a GPU, or a microprocessor suitable for retrieval and execution of instructions from the first non-volatile memory 140 and/or electronic circuits configured to perform the functionality of any of the modules 120 and 130 described below. The first non-volatile memory 140 may be one or more non-volatile machine-readable storage mediums such as any electronic, magnetic, optical, or other physical storage device that retains the stored information even when not powered. Examples of the first non-volatile memory 140 may include a solid-state drive (SSD) or a flash memory.

Each of the modules 120 and 130 may include, for example, hardware devices including electronic circuitry for implementing the functionality described below. In addition or as an alternative, each module may be implemented as a series of instructions encoded on a machine-readable storage medium, such as the first non-volatile memory 140, and executable by the processor 110. In embodiments, some of the modules 120 and 130 may be implemented as hardware devices, while other modules are implemented as executable instructions. For example, the modules 120 and 130 may be implemented as part of an application run by an operating system (OS) (not shown) running on the device 100.

The first non-volatile memory 140 may be used as a cache to store cache information. The first non-volatile memory 140 may have a lower latency than a second non-volatile memory (not shown) of the device 100. The second non-volatile memory may store the plurality of types of software, such as first and/or second types of software. The second non-volatile memory may be one or more non-volatile machine-readable storage mediums such as any electronic, magnetic, optical, or other physical storage device that retains the stored information even when not powered. Examples of the second non-volatile memory may include a hard disk drive (HDD) or a storage drive.

The cache information include may include information that is likely to be used again or frequently used, such as software instructions and/or data related thereto, such as metadata and/or data generated or modified by the user or software. For example, the cache information of a plurality of types of software, such as the OS, an application, or web browser, or hardware, such as the processor 110 or another memory, may be stored at the first non-volatile memory 140 for faster access to the cache data.

The segmenting module 120 is to divide the first non-volatile memory 140 into the plurality of segments 142-1 to 142-n. The number of segments 142-1 to 142-n and a size of each of the segments 142-1 to 142-n may be variable. The pinning module 130 may pin one or more of plurality of types of software to one or more of plurality of segments 142-1 to 142-n. For example, the pinning module 130 may pin the first type of software of the plurality of types of software to a first segment 142-1 of the plurality of segments 142-1 to 142-n.

The pinning module 130 may also, for example, pin the second type of software of the plurality of types of software to a second segment 142-2 of the plurality of segments 142-1 to 142-n, the second pinned segment 142-2 to store the cache information associated with the second type of software. The second segment 142-2 may be any of the plurality of segments 142-1 to 142-n that has not yet been pinned. Embodiments may include up to all of the plurality of segments 142-1 to 142-n being pinned. However, generally one of the plurality of segments 142-1 to 142-n, such as a third segment 142-3, may remain unpinned to act as a general cache. An example first non-volatile memory 140 is explained in greater detail with respect to FIG. 2 below.

Pinning one of the segments 142-1 to 142-n my may refer to reserving or making permanent a memory space of the pinned segment for a specific use. So if the first type of software is pinned to first segment 142-1, the first pinned segment 142-1 may store the cache information associated with the first type of software. Further, the first pinned segment 142-1 may not store any of the cache information that is not associated with the first type of software, such as that of the second type of software. Examples of the types of software may include at least part an OS, a process such as a boot, hibernate, shutdown or sleep process, a web browser, productivity tools such as a graphics editing program or CAD program editor, a software framework, a user application, a vendor application and the like.

When one of the types of software, such as the first type of software, is pinned to one of the segments 142-1 to 142-n, such as the first segment 142-1, the pinning module 130 may store code of, such as files or logical block addresses (LBAs), and/or data related to the first type of software that is most frequently used to the first segment 142-1. For example, the code may include source and/or runtime code and the data may include metadata and/or user data. Further, at least some of the code, such as the code for launching the first type of software, may be stored to the first segment 142-1, even before the first type of software is initially launched, in order to launch the first type of software more quickly. In such cases, calls for the first type of software may be directed from the second non-volatile memory to the first non-volatile memory 140.

Further, the first segment 142-1 may be updated with the code of the first type of software when the first type of software is launched and/or modified as well as when the first segment 142-1 is accessed. Alternatively or in addition, the first segment 142-1 may be updated based on usage rate of the first type of software. The usage rate may refer to a number of times that the type of software is accessed and/or modified during a given time period. For example, the pinning module 130 may update the first segment 142-1 if the usage rate of the first type of software is greater than a threshold usage rate. The pinning module 130 may update the first segment 142-1 by pushing an updated version of the file or LBA of the first type of software stored at the second non-volatile memory to the first segment 142-1 in order to replace a previous version thereof.

While FIG. 1 describes only a single type of software being pinned to one of the segments 142-1 to 142-n, embodiments may include more than one type of software being pinned to one of the segments 142-1 to 142-n. The size and number of the segments 142-1 to 142-n as well as the type of software that is pinned to any of the segments 142-1 to 142-n may be determined, for example, by a vendor, a user and/or the modules 120 and 130. Further, in embodiments, any of the size, number, and pinning of the segments 142 to 142-n may be static or changed dynamically. The term static may refer to a condition that is fixed or unchangeable. For instance, the size of or type of software pinned to the static segment may not be changed by the user. The pinning module 130 may determine which of the types of software are to be pinned to which of the segments 142-1 to 142-n based on usage rates of the types of software.

In one example, the vendor may seek to ensure that device 100 boots quickly. Therefore, the vendor may create the first segment 142-1 and statically pin the OS process, such as the boot process, to the first segment 142-1 to decrease a booting time of the device 100. As the first non-volatile memory 140 may retain information without being powered, the cache information related to the boot process will not be lost if the device 100 is powered down.

In another example, the user may vary the size of the segments 142-1 to 142-n, delete or add segments 142-1 to 142-n and/or change which of the types of software are pinned to the segments 142-1 to 142-n via a graphical user interface (GUI). The GUI may run on the OS of the device 100 and interact with the first non-volatile memory 140 via an application programming interface (API).

In yet another example, the segmenting and/or pinning modules 120 and 130 may dynamically vary the size, number, and/or pinning of the segments 142 to 142-*n* via adaptive algorithms. For instance, the segmenting module 120 may automatically decrease the size of one of the segments 142-1 to 142-*n* that is not usually completely filled or increase the size another of the segments 142-1 to 142-*n* that is usually completely filled. The responsiveness of the type of software may be a function of a size of a segment pinned thereto. The segmenting module 120 may also delete one of the segments 142-1 to 142-*n* that is pinned to the type of software that is not often accessed in order to increase the size of another of the segments 142-1 to 142-*n* that is often accessed.

The device 100 may also include multiple instances for a single type of software. For example, the device 100 may include two web browsers, such as Internet Explorer and Firefox. In this case, the cache information of all the instances of the web browser type of software may be directed to a segment pinned to the web browser type of software, such as a third segment 142-3. Alternatively, the user, the vendor and/or the pinning module 130 may determine which of the instances of the type of software are to be pinned. For example, the user may pin Firefox to the third segment 142-3 but not pin Internet Explorer to the third segment 142-3 because the user uses Firefox more than Internet Explorer. The pinning module 130 may determine which of instances of the single type of software to pin based on usage rates. For example, the pinning module 130 may pin the instance having the highest usage rate.

In one embodiment, the device 100 may include a memory controller (not shown) to control the first non-volatile memory 140 and the second non-volatile memory, such as if the first non-volatile memory 140 and the second non-volatile memory are part of a hybrid drive. In this case, the segmenting and pinning modules 120 and 130 may communicate via the OS with the memory controller to at least one of create and pin the plurality of segments 142-1 to 142-*n*. For example, the segmenting and pinning modules 120 and 130 may communicate with the memory controller via a SATA interface, a PATA interface, tagged short command files, or other hybrid drive communication mechanisms.

As noted above, the cache information will be retained in the first non-volatile memory 140, even if the device 100 is in a power off state, unlike a RAM. However, the user and/or vendor may not wish for all of the cache information to be retained. For example, the user and/or vendor may wish for confidential cache information like personal or proprietary information and/or unnecessary cache information like momentary context information of components of the device 100 to be erased. Nonetheless, the user and/or vendor may still seek to retain a remainder of the cache information, such as that the boot process for faster booting of the device 100 or that of the user application for faster launching and/or running of the user application.

The device 100 may include an erasing module (not shown) to individually erase one or more of the plurality of segments 142-1 to 142-*n* if at least one of the OS is to enter a reduced power state and the user selects the one or more plurality of segments to be erased. Examples of the reduced power state may include the device 100 entering a power off state, a hibernate state, or a sleep state. For example, the user and/or vendor may set the device 100 to automatically erase one or more of the segments 142-1 to 142-*n* before entering the reduced power state. In addition, the user may erase one more of the segments 142-1 to 142-*n* during operation of the device 100, such as through the GUI. The user may be notified after the one more of the segments 142-1 to 142-*n* have been successfully erased. The erasing module will be explained in greater detail with respect to FIG. 5 below.

Any operations or properties described with respect to the first and/or second segments 142-1 and 142-2 may be applicable to any of the other plurality of segments 142-1 to 142-*n* too. Thus, embodiments may improve a responsiveness of the types of software such as by decreasing a launch or run time by decreasing access times to the cache information thereof. Further, the plurality of segments 142-1 to 142-*n* may allow this responsiveness to occur on a first launch of the type of software and/or be retained even when switching between different type software. Further, the vendor may be able to improve a performance of the device 100 out of box (OBE).

Figure 2:
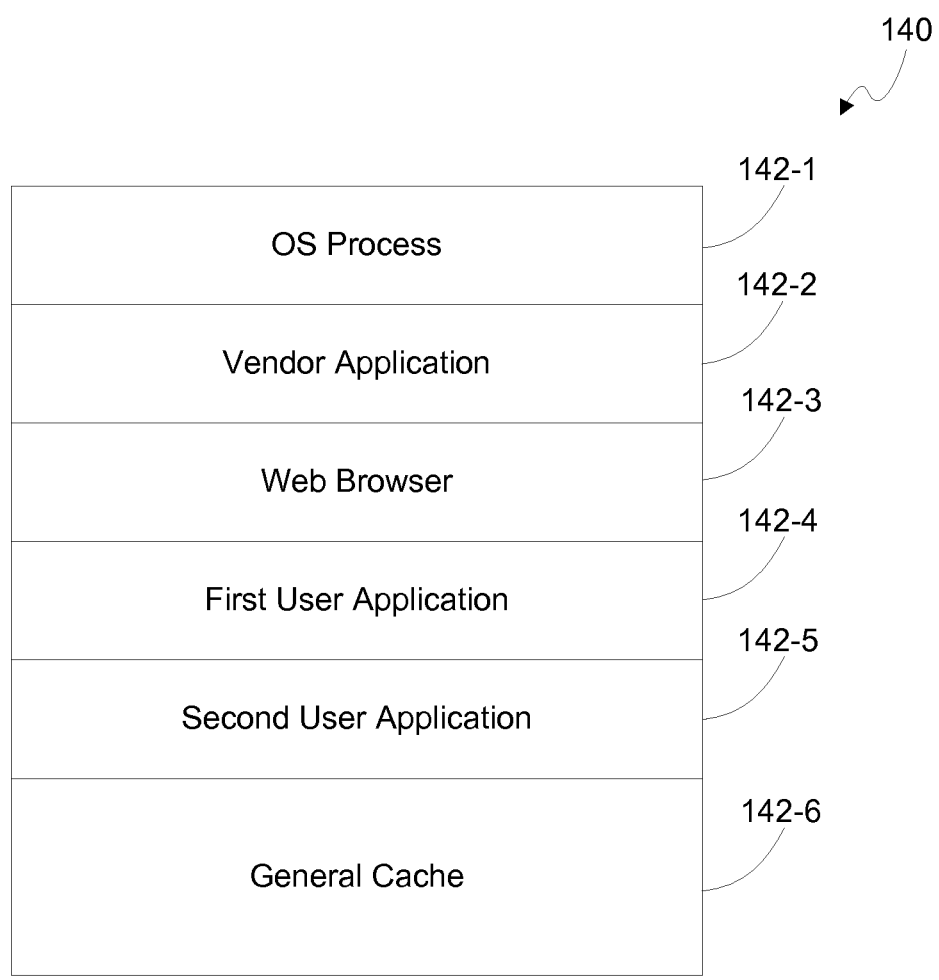
FIG. 2 is example block diagram of the first non-volatile memory of FIG. 1.

FIG. 2 is an example block diagram of the first non-volatile memory 140 of FIG. 1. In this embodiment, the first non-volatile memory 140 includes six segments 142-1 to 142-6, e.g., n is 6. The first segment 142-1 is shown to store cache information related to a first type of software, such as an OS process. Examples of the OS process may include a boot, hibernate, shutdown or sleep process. The second segment 142-2 is shown to store cache information related to a second type of software, such as a vendor application. Examples of the vendor application may include software that is preinstalled on the device 100, such as proprietary software or software specific to a hardware component of the device 100.

The third segment 142-3 is shown to store cache information related to a third type of software, such as a web browser. Examples of web browsers may include software such as Internet Explorer, Firefox, Google Chrome, Safari, Opera, and the like. The fourth segment 142-4 is shown to store cache information related to a fourth type of software, such as first user application, and the fifth segment 142-5 is shown to store cache information related to a fifth type of software, such as a second user application. Examples of the first and second user applications may include any type of user installed and/or non-vendor application, such as a graphics program, a video game, multimedia software, and the like.

The sixth segment 142-6 is shown to be a generic cache in which any of the cache information may be stored. The general cache may operate according to a cache algorithm, such as Least Recently Used (LRU), Most Recently Used (MRU) and the like. Thus, in this example, the first through fifth segments 141-1 to 142-6 are pinned while the sixth segment 142-6 remains unpinned. For example, any of the cache information that is not pinned to the first through fifth segments 142-1 to 142-6 may be stored to the sixth segment 142-6. Further, should any of the first through fifth segments 142-1 to 142-6 become filled, additional or overflow cache information thereof may also be stored to the sixth segment 142-6, despite not being pinned to the sixth segment 142-6. For example, cache information associated with the first type of software, such as the OS Process or the second type of software, such as the vendor application information, may be stored at the sixth segment 142-6, if the first or second segments 142-1 or 142-2 become full. The cache information pinned to one of the segments 142-1 to 142-5 will not be stored at the general cache or sixth segment 142-6 until the pinned segment is full, thus reducing a likelihood that part of the storage capacity of the first non-volatile memory 140 is wasted or not used.

While the first non-volatile memory 140 of FIG. 2 is shown to have six segments 141-1 to 142-6, embodiments of the first non-volatile memory 140 may have more or less than six segments. Further, a size and/or number of the segments of the first non-volatile memory 140 may depend on storage capacity of the first non-volatile memory 140. For example, there may be a greater size and/or number of the segments for a larger storage capacity than that of a smaller storage capacity of the first non-volatile memory 140.

Figure 3:
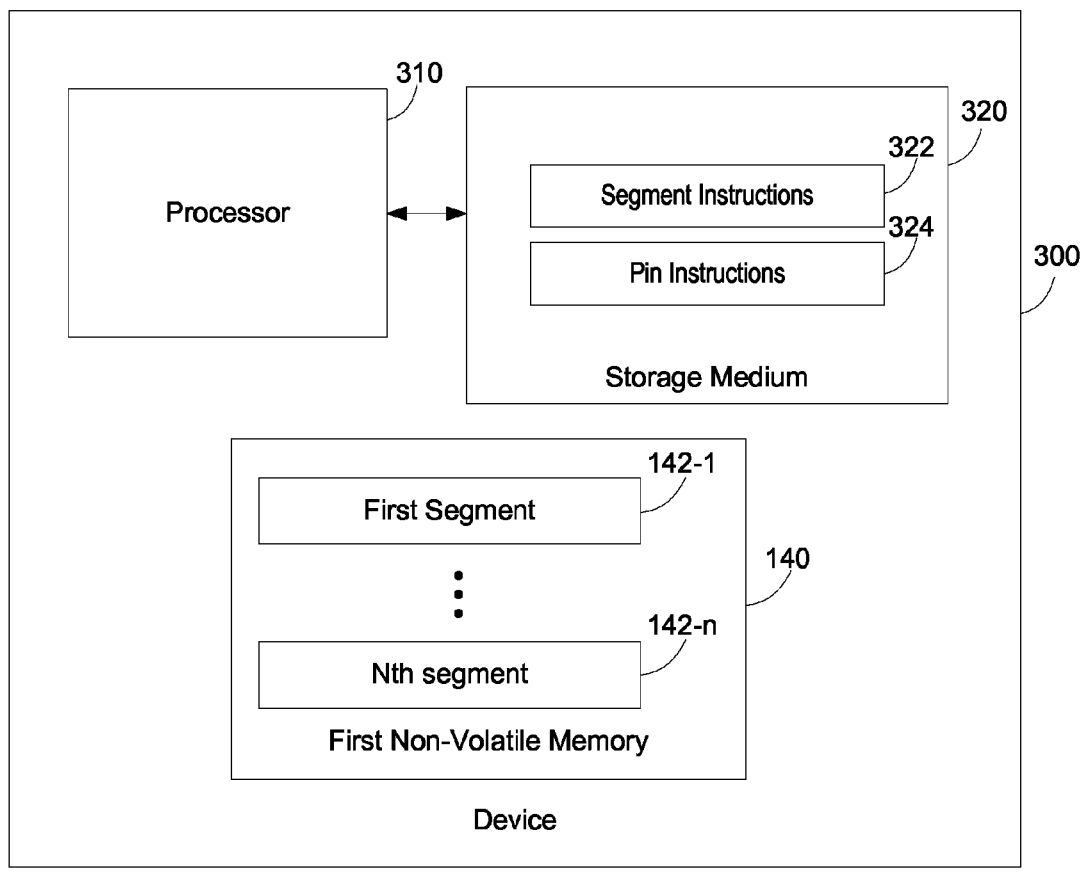
FIG. 3 is an example block diagram of a computing device including instructions for segmenting and pinning a first non-volatile memory.

FIG. 3 is an example block diagram of a computing device 300 including instructions for segmenting and pinning the first non-volatile memory 140. In the embodiment of FIG. 3, the computing device 300 includes a processor 310, the first non-volatile memory 140 and a machine-readable storage medium 320. The machine-readable storage medium 320 further includes instructions 322 and 324 for segmenting and pinning the first non-volatile memory 140.

The computing device 300 may be, for example, a chip set, a notebook computer, a slate computing device, a portable reading device, a wireless email device, a mobile phone, or any other device capable of executing the instructions 322 and 324. In certain examples, the computing device 300 may include or be connected to additional components such as memories, sensors, displays, etc. For example, the computing device 300 may include a second non-volatile memory (not shown) similar to the second non-volatile memory described in FIG. 1. Alternatively, the second non-volatile memory may be part of the machine-readable storage medium 320.

The processor 310 may be, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 322 and 324 to implement segmenting and pinning a first non-volatile memory 140. As an alternative or in addition to retrieving and executing instructions, the processor 310 may include at least one integrated circuit (IC), other control logic, other electronic circuits, or combinations thereof that include a number of electronic components for performing the functionality of instructions 322 and 324.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for segmenting and pinning a first non-volatile memory 140.

Figure 4:
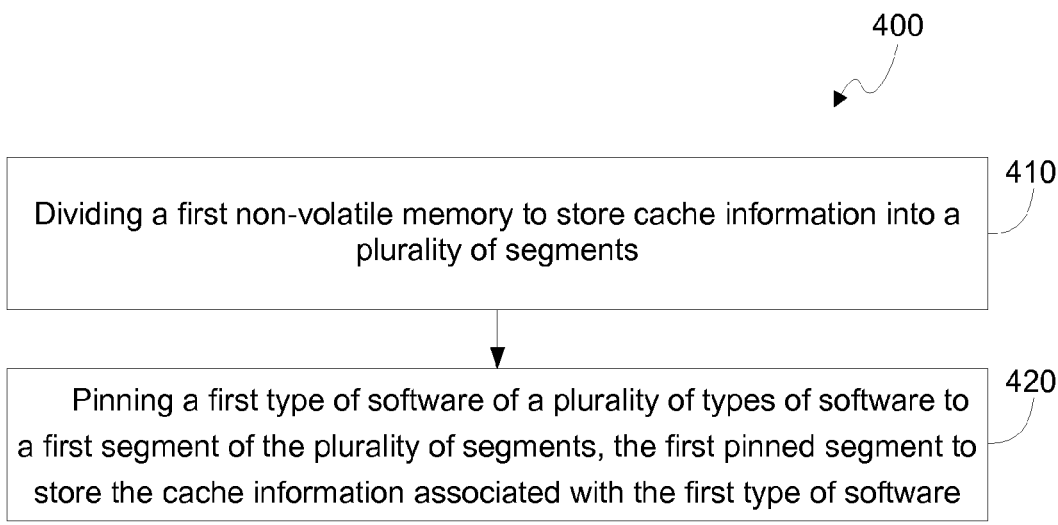
FIG. 4 is an example flowchart of a method for segmenting and pinning a first non-volatile memory.
Figure 5:
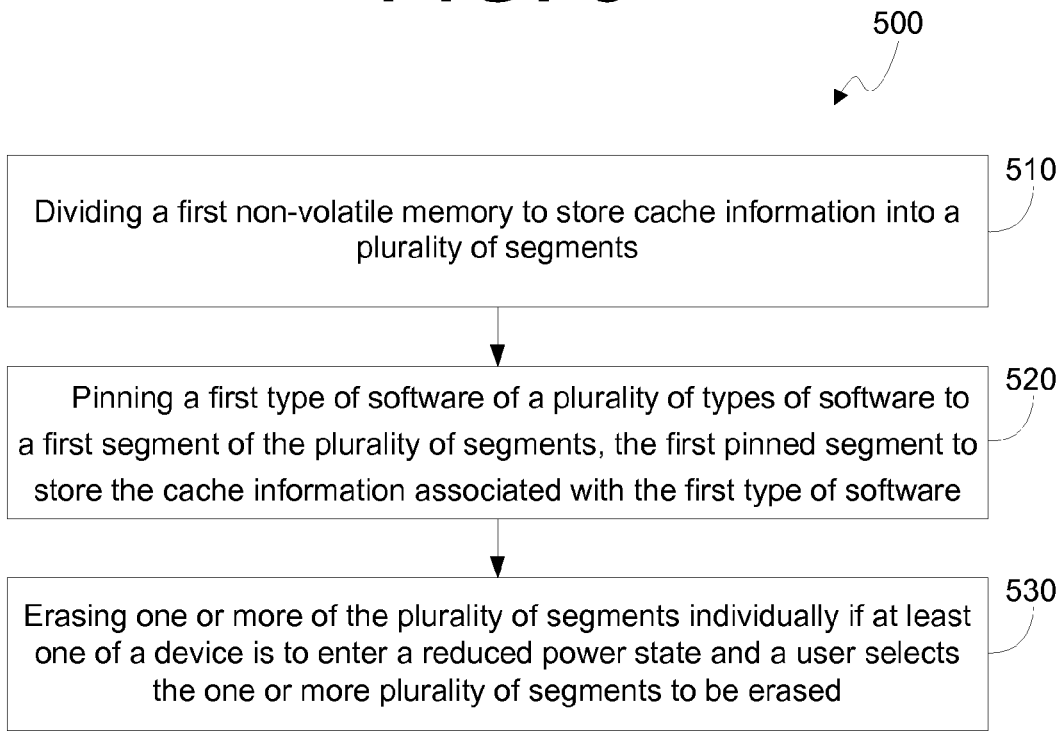
FIG. 5 is another example flowchart of a method for segmenting and pinning a first non-volatile memory.

Moreover, the instructions 322 and 324 when executed by a processor (e.g., via one processing element or multiple processing elements of the processor) can cause the processor to perform processes, such as, the process of FIG. 4 or 5. For example, the segments instructions 322 may be executed by the processor 310 to segment the first non-volatile memory 140 into a plurality of segments. The pin instructions 324 may be executed by the processor 310 to pin a first type of software of a plurality of types of software to a first segment 142-1 of the plurality of segments 142-1 to 142-n. The first pinned segment stores the cache information associated with the first type of software. The pin instructions 324 may also be executed by the processor 310 to pin a second type of software of the plurality of types of software to a second segment 142-2 of the plurality of segments 142-1 to 142-n. The second pinned segment 142-2 stores the cache information associated with the second type of software.

The machine-readable storage medium 320 may also include instructions (not shown) to store information associated with the first type of software to a third segment 142-3 of the plurality of segments 142-1 to 142-n, if the first segment is full, and to store information associated with the second type of software to the third segment 142-3, if the second segment is full. An operation of the device 300 may be described in more detail with respect to FIGS. 4 and 5.

FIG. 4 is an example flowchart of a method 400 for segmenting and pinning a first non-volatile memory 140. Although execution of the method 400 is described below with reference to the device 100, other suitable components for execution of the method 400 can be utilized, such as the device 300. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 100 divides the first non-volatile memory 140 to store cache information into a plurality of segments 142-1 to 142-n. The device 100 may initially set a number and size of the plurality of segments 142-1 to 142-n at block 410 based on at least one a vendor specification, a user command, and a size of the first non-volatile memory 140. At least one of the number and size of the plurality of segments 142-1 to 142-n may dynamically change at block 410 based on at least one of the user command and a usage pattern of the plurality of types of software.

Then, at block 420, the device 100 pins a first type of software of a plurality of types of software to a first segment 142-1 of the plurality of segments 142-1 to 142-n. The first pinned segment 142-1 stores the cache information associated with the first type of software. As noted above, the device 100 may dynamically pin one or more of the plurality of types of software to one of the plurality of segments 142-1 to 142-n based on at least one of a usage pattern of the plurality of types of software and a user command, at block 420.

For instance, the device 100 may pin a second type of software to a second segment 142-2 of the plurality of segments 142-1 to 142-n. The device 100 may not pin all the of the plurality of segments 142-1 to 142-n at block 420, such as a third segment 142-3 of the plurality of segments 142-1 to 142-n. Further, at block 420, the device 100 may store the cache information associated with the first type of software to the third segment 142-3, if the first segment 142-1 is full, and the cache information associated with the second type of software to the third segment 142-3, if the second segment is full 142-2.

The device 100 may also determine a usage rate of first and second applications classified as the first type of software at block 420 and dynamically pins one of the first and second applications to the first pinned segment 142-1 based on the determined usage rate. The device 100 updates the first pinned segment 142-1 if the first type of software is at least one of modified and launched at block 420. The device 100 at least one of launches the first type of software from the first pinned segment 142-1 and directs calls to the first type of software to the first pinned segment 142-1.

FIG. 5 is another example flowchart of a method 500 for segmenting and pinning a first non-volatile memory 140. Although execution of the method 500 is described below with reference to the device 100, other suitable components for execution of the method 500 can be utilized, such as the device 300. Additionally, the components for executing the method 500 may be spread among multiple devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 320, and/or in the form of electronic circuitry.

Block 510 of FIG. 5 may be similar to block 410 of FIG. 4 and block 520 of FIG. 5 may be similar to block 420 of FIG. 4. For instance, at block 510, the device 100 divides the first non-volatile memory 140 to store cache information into a plurality of segments 142-1 to 142-n. Then, at block 520, the device 100 pins a first type of software of a plurality of types of software to a first segment 142-1 of the plurality of segments 142-1 to 142-n. The first pinned segment 142-1 stores the cache information associated with the first type of software. At block 530, the device 100 individually erases one or more of the plurality of segments 142-1 to 142-n if at least one of the device 100 enters a reduced power state and a user selects the one or more plurality of segments 142-1 to 142-n to be erased. For example, the erasing module of the device 100 may receive a command from the user to immediately erase a first segment 142-1 of the plurality of segments 142-1 to 142-n and/or from the OS of the device 100 to erase the first segment 142-1 before the device 100 enters the reduced power state.

However, if the first non-volatile memory 140 includes a flash or SSD memory, the first non-volatile memory 140 may only be erasable in units of blocks that do not correspond to an addressing structure of the plurality of segments 142-1 to 142-n. For example, erasing one of the blocks may erase only part of the first segment 142-1 and/or erase part of second segment 142-2 of the plurality of segments 142-1 to 142-n. In order to ensure that only the first segment 142-1 is erased, the erasing module may communicate with a flash controller (not shown) of the first non-volatile memory 140.

The flash controller may maintain a flash file system that is used to provide procedures to store, retrieve and update data, as well as manage the available space on the first non-volatile memory 140. For example, as the blocks may have to be explicitly erased before being written to, the flash controller may erase unused blocks while the device 100 is idle to save time. Further, the flash controller may distribute writes evenly over the entire first non-volatile memory 140 to reduce or prevent wear leveling, which occurs when one of the blocks wears out by being repeatedly overwritten to.

The erasing module may communicate with the flash controller to determine a correlation between the mapping of the plurality of segments 142-1 to 142-n and the blocks of the first non-volatile memory 140. Also, the erasing module may communicate with the flash controller to retain the cache information of the plurality of segments 142-1 to 142-n that are not to be erased. For example, if erasing the first segment 142-1 would also erase at least part of the second segment 142-2, such as if the first and second segments 142-1 and 142-2 share part of the same block, the erasing module may communicate with the flash controller to first save the cache information of the second segment 142-2 in the block to be erased to another location, such as to another memory block. Alternatively, the cache information of the third segment 142-3 in the block to be erased may be saved to another memory, such as the storage medium 320 or second non-volatile memory. Then, the erasing module may communicate with the flash controller to erase the first segment 142-1 by erasing the one or more blocks storing the cache information of the first segment 142-1. Afterward, the erasing module may direct the flash controller to write back the cache information of the third segment 142-3, depending on where the cache information of the third segment 142-3 was stored.

Moreover, at block 530, the erasing module may communicate with the OS to delay the device 100 from entering the reduced power state until the erasing of the one or more segments 142-1 to 142-n is completed. However, if the erasing of the one or more plurality of segments 142-1 to 142-n is not completed before the device 100 enters the reduced power state, the erasing module is to continue erasing the one or more plurality of segments 142-1 to 142-n when the device 100 returns to a high power state, such as a power on state. Further, the one or more plurality of segments 142-1 to 142-n being erased may not be available to store the cache information until the erasing of the one or more plurality of segments 142-1 to 142-n is completed. While embodiments have described the above procedure with respect to erasing, embodiments are not limited thereto. For example, the device 100 may also carry out similar procedures for overwriting and/or encrypting/decrypting the cache information of at least one of the segments 142-1 to 142-n.

According to the foregoing, embodiments provide a method and/or device for segmenting and pinning a first non-volatile memory storing cache information. For example, cache information of a first type of software may be pinned to a first segment of the plurality of segments. Thus, in embodiments, the first type of software may be immediately responsive or initially more responsive, even for a first access of the first type of software or even if a second type of software is heavily used between accesses of the first type of software.

We claim:

1. A method for segmenting a cache, comprising:
   dividing a first non-volatile memory to store cache information into a plurality of segments; and
   pinning a first type of software of a plurality of types of software to a first segment of the plurality of segments, wherein the first pinned segment stores the cache information associated with the first type of software, wherein the pinning determines a usage rate of first and second applications classified as the first type of software, wherein the usage rate indicates a number of times the first type of software is accessed, modified, or a combination thereof during a given time period, and wherein the pinning dynamically pins one of the first and second applications to the first pinned segment based on the determined usage rate.

2. The method of claim 1, wherein the pinning pins a second type of software of the plurality of types of software to a second segment of the plurality of segments, and the second pinned segment stores the cache information associated with the second type of software.

3. The method of, claim 2, wherein the first and second types of software are at least one of a type of application and a type of process related to an operating system (OS), the application is at least one of a web browser, a user application and a vendor application, and the process is at least one of a boot, hibernate, shutdown and sleep process.

4. The method of claim 3, wherein the pinning does not pin a third segment of the plurality of segments, the pinning stores the cache information associated with the first type of software to the third segment, if the first segment is full, and the pinning module stores the cache information associated with the second type of software to the third segment, if the second segment is full.

5. The method of claim 1, wherein the dividing initially sets a number and size of the plurality of segments based on at least one a vendor specification, a user command, and a size of the first non-volatile memory, the dividing dynamically changes at least one of the number and size of the plurality of segments based on a usage pattern of the plurality of types of software.

6. The method of claim 1, wherein the pinning dynamically pins one of the plurality of types of software to one of the plurality of segments based on at least one of a usage pattern of the plurality of types of software and a user command.

7. The method of claim 1, wherein, the pinning updates the first pinned segment if the first type of software is at least one of modified and launched, and the pinning at least one of launches the first type of software from the first pinned segment and directs calls to the first type of software to the first pinned segment.

8. The method of claim 1, further comprising: erasing one or more of the plurality of segments individually if at least one of a device including the first non-volatile memory is to enter a reduced power state and a user selects the one or more plurality of segments to be erased.

9. The method of claim 8, wherein the erasing is to continue erasing the one or more plurality of segments when the device returns to a high power state, if the erasing of the one or more plurality of segments is not completed before the device entered the reduced power state, and the one or more plurality of segments being erased are not available to store the cache information until the erasing is completed.

10. A non-transitory computer-readable storage medium storing instructions that, if executed by a processor of a device, cause the processor to:
segment a first non-volatile memory to store cache information into a plurality of segments; and
pin a first type of software of a plurality of types of software to a first segment of the plurality of segments, wherein the first pinned segment stores the cache information associated with the first type of software, wherein the pinning determines a usage rate of first and second applications classified as the first type of software, wherein the usage rate indicates a number of times the first type of software is accessed, modified, or a combination thereof during a given time period, and wherein the pinning dynamically pins one of the first and second applications to the first pinned segment based on the determined usage rate.

11. The non-transitory computer-readable storage medium of claim 10, further comprising instructions that, if executed by the processor, cause the processor to:
pin a second type of software of the plurality of types of software to a second segment of the plurality of segments, wherein the second pinned segment stores the cache information associated with the second type of software, and at least one of the first and second type of software are selected to be pinned based on at least one of a user command, a vendor specification, and a usage rate.

12. The non-transitory computer-readable storage medium of claim 11, further comprising instructions that, if executed by the processor, cause the processor to:
store information associated with the first type of software to a third segment of the plurality of segments, if the first segment is full, and
store information associated with the second type of software to the third segment, if the second segment is full.

13. A device, comprising:
a first non-volatile memory to store cache information;
a segmenting module to divide the first non-volatile memory into a plurality of segments; and
a pinning module to
pin a first type of software of a plurality of types of software to a first segment of the plurality of segments, wherein the first pinned segment stores the cache information associated with the first type of software;
determine a usage rate of first and second applications classified as the first type of software, wherein the usage rate indicates a number of times the first type of software is accessed, modified, or a combination thereof during a given time period; and
dynamically pin one of the first and second applications to the first pinned segment based on the determined usage rate.

14. The device of claim 13, further comprising:
a second non-volatile memory to store the first type of software; and
a memory controller to control the first and second non-volatile memories, wherein the segmenting and pinning modules communicate via an operating system (OS) with the memory controller to at least one of create and pin the plurality of segments.

* * * * *

UNITED STATES PATENT AND TRADEMARK OFFICE
CERTIFICATE OF CORRECTION

PATENT NO.        : 9,697,115 B2
APPLICATION NO.   : 14/353862
DATED             : July 4, 2017
INVENTOR(S)       : Fred Charles Thomas et al.

It is certified that error appears in the above-identified patent and that said Letters Patent is hereby corrected as shown below:

In Column 10, Line 64, in Claim 3, delete "of," and insert -- of --, therefor.

In Column 12, Line 29 approx., in Claim 13, delete "to" and insert -- to: --, therefor.

Signed and Sealed this
Twenty-sixth Day of September, 2017

Joseph Matal
*Performing the Functions and Duties of the
Under Secretary of Commerce for Intellectual Property and
Director of the United States Patent and Trademark Office*